US011379840B2

(12) United States Patent
Gandhi (10) Patent No.: US 11,379,840 B2
(45) Date of Patent: Jul. 5, 2022

(54) REAL-TIME CONFIGURABLE SMART CARDS

(71) Applicant: Bank of America Corporation, Charlotte, NC (US)

(72) Inventor: Jesika Gandhi, Sunnyvale, CA (US)

(73) Assignee: Bank of America Corporation, Charlotte, NC (US)

( * ) Notice: Subject to any disclaimer, the term of this patent is extended or adjusted under 35 U.S.C. 154(b) by 156 days.

(21) Appl. No.: 16/994,790

(22) Filed: Aug. 17, 2020

(65) Prior Publication Data

US 2022/0051248 A1 Feb. 17, 2022

(51) Int. Cl.
| | |
|---|---|
| *G06K 19/06* | (2006.01) |
| *G06Q 20/40* | (2012.01) |
| *G06Q 20/36* | (2012.01) |
| *G06Q 20/34* | (2012.01) |
| *G06Q 20/20* | (2012.01) |
| *G06K 19/07* | (2006.01) |

(52) U.S. Cl.
CPC ... *G06Q 20/4012* (2013.01); *G06K 19/06037* (2013.01); *G06K 19/0723* (2013.01); *G06Q 20/20* (2013.01); *G06Q 20/3572* (2013.01); *G06Q 20/367* (2013.01)

(58) Field of Classification Search
CPC .. G06Q 20/4012; G06Q 20/20; G06Q 20/367; G06K 19/06037; G06K 19/0723
See application file for complete search history.

(56) References Cited

U.S. PATENT DOCUMENTS 5,914,472 A * 6/1999 Foladare .................. G07F 7/08
235/382.5

OTHER PUBLICATIONS

Federico Stirparo, "Key Concepts on eSIM and Remote SIM Provisioning," https://www.intraway.com/blog/esim-remote-sim-provisioning, Intraway, Jul. 26, 2019.
Dan Grabham, "What is an eSIM and What Does it Mean for Your New Galaxy Z Flip, Moto, Pixel or iPhone?" https://www.msn.com/en-gb/money/technology/what-is-an-esim-and-what-does-it-mean-for-your-new-galaxy-z-flip-moto-pixel-or-iphone/ar-BBZZGRc, Pocket-lint Limited, May 20, 2020.
Steve Ranger, "Everything You Need to Know About the Internet of Things Right Now," https://www.zdnet.com/article/what-is-the-internet-of-things-everything-you-need-to-know-about-the-iot-right-now/, ZDNet, Feb. 3, 2020.

* cited by examiner

*Primary Examiner* — Jamara A Franklin
(74) *Attorney, Agent, or Firm* — Weiss & Arons LLP (57) ABSTRACT

A method for enabling, via a digital wallet application, a smart card to operate as a primary smart card for a plurality of a user's smart cards. The primary smart card may include a microprocessor, a touch screen, a wireless interface and an embedded subscriber identification module ("E-SIM") card. The method may include retrieving on the primary smart card, from the digital wallet application, a list of a plurality of smart cards, displaying on the touch screen of the primary smart card, a selectable list of the plurality of smart cards, receiving, via the touch screen, a selected smart card and storing the card data on the E-SIM of the primary smart card. When the primary smart card is within a pre-determined proximity to a point-of-sale ("POS") device, the primary smart card may be configured to transmit the card payment data stored on the E-SIM to the POS device.

20 Claims, 6 Drawing Sheets

REAL-TIME CONFIGURABLE SMART CARDS

FIELD OF TECHNOLOGY

Aspects of the disclosure relate to smart cards. Specifically, aspects of the disclosure relate to a dynamically configurable smart card.

BACKGROUND OF THE DISCLOSURE

The implementation of digital wallets on mobile devices simplifies the method of making payments. The digital wallet eliminates the need for carrying around numerous physical credit/debit cards in a physical wallet and combines them into one digital wallet on the user's mobile device.

However, many people today still prefer using traditional payment methods, such as a credit card. These traditional methods are preferred because of ease of use, long standing habit and, for some people, are simpler because they do not require substantive technological know-how. A large element of these people may be losing out on the advantages of a digital wallet, at least because a credit card typically only supports one method of payment and does not offer the flexibility and advantages associated with a digital wallet.

It would be desirable, therefore, to provide systems and methods for upgrading a traditional credit card to support one or more functionalities typically associated with a digital wallet.

SUMMARY OF THE DISCLOSURE

A method is provided for enabling a smart card to operate as a primary smart card for a plurality of a user's smart cards. The method may be enabled via an electronic communication with a digital wallet application. The digital wallet application may be resident on a mobile device of the user associated with the primary smart card. The primary smart card may be configured to represent each of the user's smart cards and may be configured, in real-time, to perform as an alternative smart card when performing a transaction.

The primary smart card may include a microprocessor, a touch screen and a wireless interface configured to provide a wireless communication. The primary smart card may also include an embedded subscriber identification module ("E-SIM") card. The E-SIM may be configured for storing card data associated with the primary smart card. The card data stored on the E-SIM may be re-writable data. The primary smart card may also include a power source for providing power to the microprocessor, the E-SIM and the touch screen.

The method may include storing card data for each of the plurality of smart cards associated with the user, in a database associated with the digital wallet application. The digital wallet application may be an application on the user's mobile device. The application may be associated with a financial institution. Each of the plurality of smart cards stored in the digital wallet application may be associated with an originating entity. The originating entity may be one of, but not limited to, VISA®, MasterCard® and American Express®. The originating entity may be a company that distributes gift cards and/or loyalty cards.

Each of the user's smart cards stored in the digital wallet application may include the card payment data. It should be appreciated that the card payment data may be adjusted and edited by the user of the primary smart card on the user's mobile device.

At the time of a transaction, the primary smart card may be enabled to be alternated to perform as any one of the plurality of the user's smart cards for completion of the transaction. This may enabled via the communication between the E-SIM and the digital wallet application. The E-SIM may store alternating card data for each transaction and may execute the transaction based on the card data stored at the time of the transaction.

The method may include retrieving on the primary smart card, from the digital wallet application, a list of the plurality of smart cards stored in the digital wallet application. The method may further include displaying on the touch screen of the primary smart card, a selectable list of the plurality of smart cards.

The method may further include receiving, via the touch screen, a selected smart card. The selected smart card may be selected by the user of the primary smart card.

In response to the selection, the method may include storing the card data associated with the selected smart card on the E-SIM of the primary smart card. The card data being stored may replace previously stored card data stored on the E-SIM.

When the primary smart card is within a pre-determined proximity to a point-of-sale ("POS") device, the primary smart card is configured to transmit the card payment data stored on the E-SIM to the POS device to complete a transaction.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A primary smart card is provided. For the purposes of the disclosure, a smart card and/or a primary smart card may be understood to refer to any smart debit/credit card that generally shares the dimensions of a typical debit/credit card and may, in certain circumstances and configurations, be used to perform transactions. The primary smart card may include wireless communication capabilities. The primary smart card may operate as a representative for all of a user's payment cards. The primary smart card may be in wireless communication with a digital wallet application. The digital wallet application may be resident on the user's mobile device.

The primary smart card may include an embedded subscriber identification module ("E-SIM") card. The E-SIM may be configured to store card data. The card data may be re-writable card data associated with the primary smart card.

An E-SIM is a very small chip that may be embedded directly into the hardware of the smart card. An E-SIM is a global specification by the Global System for Mobile Communications Associations ("GSMA") which may enable remote SIM provisioning ("RSP") of any mobile device.

The traditional SIM card is inserted into mobile devices and may occupy a significant portion of the device. E-SIM's, when embedded into the hardware of mobile devices such as a smartphone, occupy a much smaller portion of the device then the traditional SIM cards. E-SIM's, in the usage with mobile devices, include information that enables a subscriber to access a mobile operator. A single user's device that includes an E-SIM may be enabled to have multiple mobile operators associated with the one mobile device for different purposes and services. For example, when travelling to a different country there may be no need to swap SIM cards. The E-SIM is configured to be accessed and updated remotely and can switch operators when in a different county. Phone numbers associated with the smartphone may be changed remotely and directly stored on the E-SIM. All data changes and configurations may be enabled via a remote SIM provisional solution ("RSP").

An advantage of the E-SIM is that all data and information stored on the E-SIM is rewritable and therefore when a change is made in the data, the E-SIM does not need to be replaced. Because the E-SIM is embedded in the hardware of the device, the E-SIM may be tamper-proof and theft-proof.

For the purpose of the disclosure, embedding an E-SIM into the hardware of the smart card may enable card payment data associated with the smart card to be updated and changed remotely without the need of replacing the card. Through wireless communication capabilities and the machine-to-machine ("M2M") communication between the smart card and associated software applications, data changes may be directly re-written on the E-SIM and stored on the E-SIM.

The E-SIM may be an MFF2 which may be a height of 6 mm, a width of about 5 mm and 0.67 mm in thickness. In some embodiments, the E-SIM may be 2.5 mm×2.3 mm×0.2 mm (thick).

It should be appreciated that the size of the smart card disclosed herewith, including the E-SIM, may not disrupt the traditional form factor of the standard debit/credit card. For reference, an exemplary form factor of a smart card according to the embodiments may be about 53.98 mm×about 85.60 mm×about 0.8 mm (thick).

It should further be appreciated that since the E-SIM operates through a mobile network operator, the primary smart card in accordance with principles of the disclosure, may be allocated a telephone number being associated with the card. The primary smart card may be configured to include architecture that enables the primary smart card to operate additionally as a mobile phone. The architecture may include speakers, Bluetooth® capabilities, a touch keypad displayed on the touch screen and antennas.

Because the smart card may include a telephone number and may be configured to communicate with a mobile network operator, when the smart card is misplaced, the card may be tracked and located via the mobile network operator and digital wallet application capabilities.

The primary smart card may also include a microprocessor. The primary smart card may include a touch screen. The primary smart card may include a wireless communication interface configured to provide wireless communication.

The touch screen may include organic light emitting diode ("OLED") technology. A touch screen constructed using OLED technology may have a thickness that is not greater than 0.25 mm. OLEDs may be flexible. The microprocessor may configure a touch screen constructed using OLEDs to display information.

OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment. Furthermore, OLEDs may be used to construct a display that consumes less power compared to other display technologies.

The smart card may include various other components, such as a battery, a speaker, and antennas. The microprocessor may have a thickness that is not greater than 0.25 millimeters ("mm"). The microprocessor may control overall operation of the smart card and its associated components. The smart card may include RAM, ROM, an input/output ("I/O") module and a non-transitory or nonvolatile memory.

The I/O module may include a microphone which may accept user provided input. The I/O module may include one or more speaker(s) for providing audio output and a touch screen for providing textual, audiovisual and/or graphical output. Software may be stored within the non-transitory memory and/or other storage media. The software may provide instructions to the microprocessor for enabling the smart card to perform various functions. For example, the non-transitory memory may store software used by the smart card, such as an operating system, application programs, web browser and a database.

Alternatively, some or all of computer executable instructions of the smart card may be embodied in hardware or firmware components of the smart card. Application programs, which may be used by the smart card, may include computer executable instructions for invoking user functionality related to communication, authentication services, and voice input and speech recognition applications. Application programs may utilize one or more algorithms that encrypt information, process received executable instructions, interact with an ATM and perform power management routines or other suitable tasks. The smart card may include non-transitory memory locations within the housing. The microprocessor may access such memory locations. The non-transitory memory locations may be included in the microprocessor. The non-transitory memory locations may store software, that when executed by the microprocessor, cause the smart card to perform various functions.

In some embodiments, the smart card may be activated in response to receiving high frequency wireless signals. The high frequency signals may be detected by the communication interface. The high frequency signals may be generated by a near field communication ("NFC") reader. The NFC reader may be embedded within a POS device within the pre-determined proximity of the smart card. The high frequency signals may provide power to one or more components of the smart card. In some embodiments, in response to receiving the power, the microprocessor may be activated and begin to draw power from a battery on the smart card.

The smart card may operate in a networked environment. The smart card may support establishing communication channels with one or more devices. The smart card may connect to a local area network ("LAN"), a wide area network ("WAN") or any suitable network. When used in a LAN networking environment, the smart card may be connected to the LAN through a network interface or adapter. The communication interface may include the network interface or adapter.

When used in a WAN networking environment, the smart card may include a modem or other means for establishing communications over a WAN, such as the Internet. The communication interface may include the modem. It will be appreciated that the network connections shown are illustrative and other means of establishing a communications link between devices may be used. The existence of any of various well known protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones multiprocessor systems, microcomputers, minicomputers, mainframe computers, distributed computing environments that include any of the above systems or devices, and the like.

The smart card may utilize computer-executable instructions, such as program modules, being executed by the microprocessor. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic components of the smart card. For example, the battery may supply power to a keypad, the communication interface and the microprocessor. The battery may have a thickness that is not greater than 0.5 mm.

The battery may be recharged via an electrical contact, such as, for example, when the smart card is in contact with a device. The smart card's power source may include high frequency signals received from a device. The smart card may be configured to utilize received high frequency signals to recharge the battery or provide power to other components of the smart card. The smart card may include an electrical contact. An electrical contact may be constructed using any suitable material that conducts or transfers electricity. The smart card may include a plurality of electrical contacts. An electrical contact may be accessible on any suitable face of a housing of the smart card. The contact may be accessible through a thickness of the housing. The contact may be utilized to transfer electrical charge to a rechargeable battery when the smart card is inserted into a device card reader.

The smart card may include a communication interface. The communication interface may have a thickness that is not greater than 0.8 mm. The communication interface may include circuity for establishing electronic communication with a device. The communication interface may be configured to implement protocols for wireless communication. The communication interface may include one or more antennae for transmitting and receiving wireless signals.

The communication interface may include communication circuitry. The communication circuitry may include software and/or hardware for establishing a wired or wireless communication channel with the device. The communication interface may be compatible with illustrative wireless channels such as Wi-Fi, Bluetooth, Ethernet, NFC, satellite and cellular telecommunications. Wi-Fi may include passive Wi-Fi with lower power consumption than typical Wi-Fi. The communication interface may include a Near Field Communication ("NFC") chip. The NFC chip may communicate over a typical NFC range (~2 in.) when transmitting or receiving sensitive data. An illustrative NFC chip may utilize a 13.56 MHz radio frequency.

In some embodiments, the smart card may be activated in response to receiving wireless signals from the device. The wireless signals may provide power to one or more components of the smart card. Illustrative wireless signals may include NFC signals. For example, in response to receiving power via the wireless signals, a microprocessor of the smart card may be activated.

The primary smart card, in accordance with the disclosure, may also include a power source for providing power to the microprocessor, the E-SIM and the touch screen.

The primary smart card may be a 'physical' wallet for all of a user's credit/debit cards similar to a digital wallet. The digital wallet enables a user to store all of the user's credit/debit cards within one application. At the time of a transaction, the user may select from the digital wallet, on the user's mobile device, a specific card and scan or contactlessly perform the transaction.

The primary smart card may be in direct electronic communication with the user's digital wallet application. The primary smart card, via the E-SIM, may be enabled to operate as any one of the user's debit/credit cards at the time of a transaction.

The digital wallet application may be set up via the user's financial institution. The digital wallet app may be configured to store credit/debit card payment data for each of the user's cards. The digital wallet application may also store loyalty card information and digital coupons.

Card payment data for each card may include a card number and the expiration date associated with each card number. The card payment data may also include the security code associated with each card number. Additionally, the E-SIM embedded within the primary smart card, enables the primary smart card to be associated with a telephone number. The card payment data may also include the telephone number associated with each card number.

When the primary smart card is within a pre-determined proximity of a point-of-sale ("POS") device, the primary smart card may be configured to prompt the user, on the touch screen, for a selection of a smart card from a selectable list of a plurality of smart cards displayed on the touch screen. The pre-determined proximity may be a proximity that may enable a near-field communication ("NFC") between the primary smart card and the POS.

The selectable list of the plurality of smart cards may be received, via NFC, from the user's digital wallet application to the primary smart card. The selectable list may be displayed on the touch screen for the user's selection.

The primary smart card may be configured to receive, via the touch screen, a selected smart card. Upon receipt of the selection of the selected smart card, the primary smart card may be configured to retrieve card payment data from the mobile wallet application associated with the selected smart card. The card payment data may be stored on the E-SIM. The card payment data may overwrite the card payment data previously stored on the E-SIM from a prior transaction.

Following the retrieval of the card payment data, the primary smart card may be configured to transmit the card payment data to the POS device. The card payment data may be transmitted in order to complete a transaction.

The card number that is included in the card payment data at the time of the transaction, may be the card number stored on the E-SIM. The card number stored on the E-SIM may be dynamic. For each transaction, the card number and associated card payment data may be dynamically changed to an alternate card, via the digital wallet application.

When the POS device is not configured for NFC, a contactless transaction may not be performed. The primary smart card may be configured to retrieve the card payment data from the digital wallet application associated with the selected smart card. The card payment data may then be displayed on the touch screen.

The card payment data may be embedded in a quick response ("QR") code. The QR code may be displayed on the touch screen. The user may then scan the QR code at the POS device to complete the transaction.

The digital wallet application may also be enabled to operate as a remote SIM provisioning ("RSP") system. Because the E-SIM is embedded within the hardware of the device, the E-SIM may not need to be pre-programmed. The E-SIM may be programmed, in real-time, via RSP. The digital wallet application may enable the over-the-air ("OTA") provisioning of the data on the E-SIM.

In some embodiments, prior to the completion of completing the transaction between the POS device and the primary smart card, the primary smart card may verify the user using the primary smart card as being the owner of the primary smart card. This may prevent fraud on the primary smart card. When the user and the primary smart card are in within the pre-determined proximity of the POS device, the primary smart card may be configured to transmit a communication to the mobile device that is linked to the primary smart card of the user.

The communication may include a request for input of a personal identification number ("PIN") associated with a primary smart card account of the user. The digital wallet application may receive input of the PIN, by the user of the primary smart card. The digital wallet application may be configured to verify that the PIN matches to the PIN stored in the profile of the user of the mobile device and the primary smart card. Following verification, the digital wallet application may transmit the list of the plurality of smart cards to the primary smart card. The primary smart card may be configured to display the list of the plurality of smart cards on the touch screen of the primary smart card.

In certain embodiments, a smart card communication system is provided. The smart card communication system may include a plurality of smart cards. The plurality of smart cards may include a dominant smart card and a plurality of subordinate smart cards. The plurality of smart cards may be managed and handled by a single user. The dominant smart card may be associated with the user and may be used by the user. The plurality of subordinate smart cards may each be used and associated with a different user however may only be governed by the single user of the dominant smart card.

In certain embodiments, the dominant smart card may be associated with the primary credit/debit card for a user. The dominant smart card may be configured to represent each of a user's plurality of subordinate smart cards.

A user typically has numerous credit/debit cards. The dominant smart card may be enabled to be used in a transaction and represent any one of the user's plurality of subordinate smart cards.

Each of the plurality of smart cards may include a microprocessor, a touch screen and an E-SIM card. The E-SIM may be configured for storing card data. The card data may be dynamic card data. Each of the subordinate smart cards may include a separate set of card payment data. Each subordinate smart card may include the card data stored on the E-SIM of the subordinate smart card. The card data may be re-writable data. Additionally, the card data may also be stored on a digital wallet application.

It should be appreciated that each of the subordinate smart cards may be associated with a different user. Each user may have a unique subordinate smart card with a different card number. The E-SIM embedded in each of the cards may enable each of the plurality of smart cards card payment data to be adjusted and/or changed. The changes and adjustments may only be performed solely by the user of the dominant smart card via the digital wallet application.

The card data may include a card number and a date of expiration for the card number. The card data may also include a maximum spending limit value for the card number. The card data may further include an activation state value. The activation state value may be equal to a value of 'activated' or 'de-activated.'

The card number for each of the subordinate smart cards may be a static card number. The card number may not be changed. The activation state, maximum spending limit value and the date of expiration for each of the subordinate smart cards, may be altered via the digital wallet application, by the user of the dominant smart card.

It should be further appreciated that the card number for the dominant smart card may be changed along with the other card payment data. The dominant smart card may be configured to perform as a primary card for all of the user's credit/debit cards stored in the user's digital wallet application on the user's mobile device.

Each of the plurality of smart cards may be in electronic communication with the digital wallet application. The digital wallet application may be resident on the mobile device of the user. The digital wallet application may be configured for managing the card data stored on each E-SIM for each of the plurality of smart cards. The digital wallet application may be configured to be managed solely by the user of the dominant smart card.

In some embodiments, the digital wallet application may also be an RSP system. In other embodiments, the RSP system may be a third party system for the E-SIM. The third party RSP system may be in communication with the digital wallet application for managing the card data for each E-SIM.

A card number for the dominant smart card may not be displayed on the face of the smart card. Additionally, a card number for the dominant smart card may not be embedded in a magnetic strip and/or chip on the smart card itself. Card data associated with the dominant smart card may only be stored on the E-SIM.

The card number for each of the subordinate smart cards may be displayed on the face of the smart card and in some embodiments may also be stored in the magnetic strip and/or chip of the card. The card number for each of the subordinate smart cards may be non-configurable.

The dominant smart card may be one card that can be configured to perform and represent numerous smart cards, one for each transaction. When the user of the dominant smart card changes the card number of the dominant smart card to an alternate card number, via the digital wallet application, the date of expiration and the other card payment data may be automatically updated on the E-SIM to correlate to the alternate card number.

The smart card communication system may enable the user of the dominant smart card to administer a change in the card payment data associated with one of the subordinate smart cards. The user may be enabled to make the change through the digital wallet application. The user may change the activation state of the card to be deactivated. The user may increase the maximum spending limit on the subordinate smart card. When the user performs the change within the digital wallet application, the card data stored on the E-SIM of the corresponding subordinate smart card may automatically be changed, in real-time.

Figure 1:
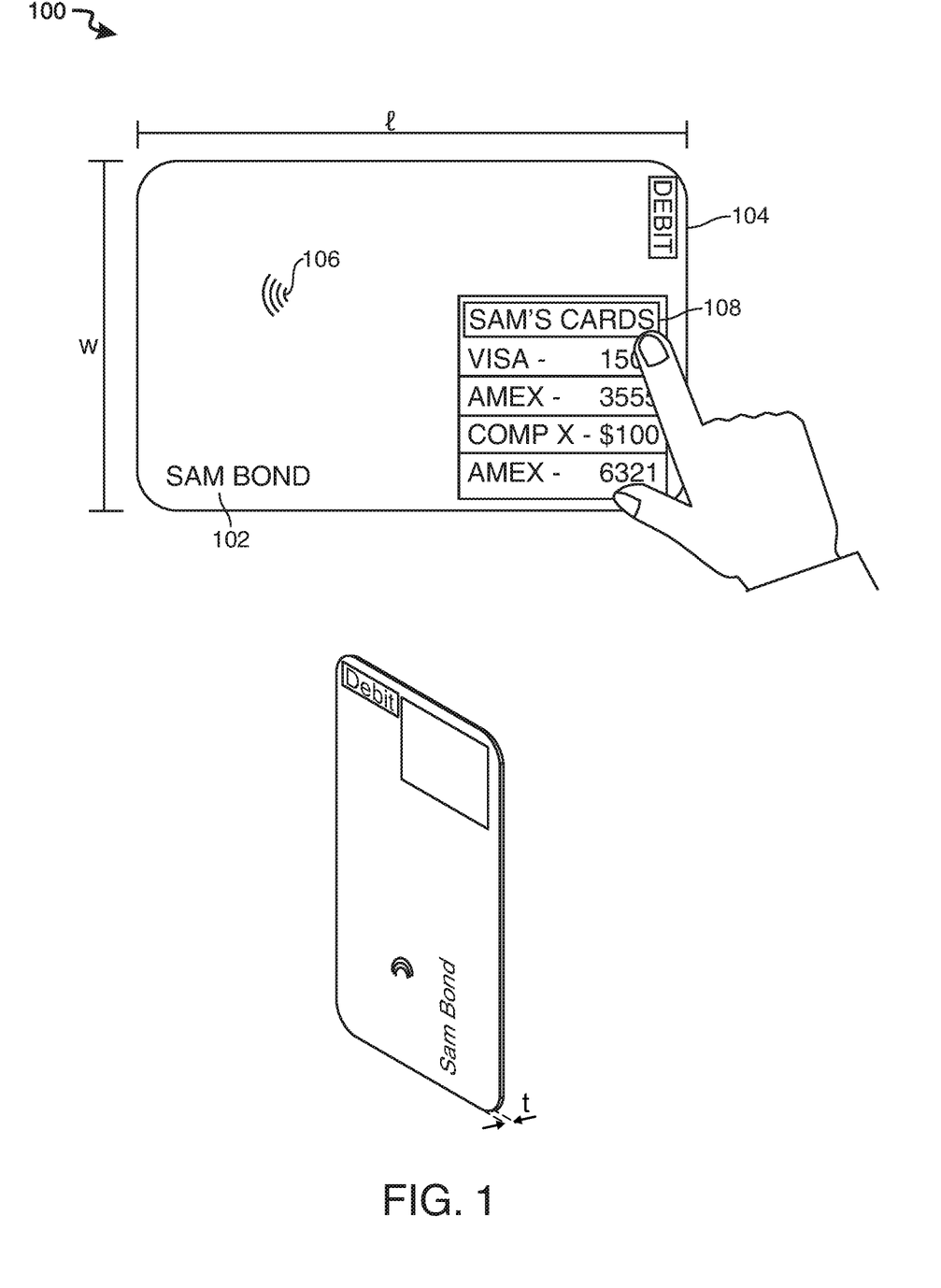
FIG. 1 shows an illustrative architecture in accordance with principles of the disclosure.

FIG. 1 shows a primary smart card 100 in accordance with principles of the disclosure. Primary smart card 100 may be associated with user 102. Primary smart card 100 may be a debit or credit card 104. In some embodiments, the primary smart card 100 may be a gift card or loyalty card.

Primary smart card 100 may be a primary smart card operating as a 'physical' digital wallet for user 102. All of the user's card payment data may be stored on an E-SIM card embedded within primary smart card 100 (described in FIG. 2). When primary smart card 100 is performing a transaction, the card payment data may be transmitted to the POS device using wireless capabilities as shown at 106.

Primary smart card may be configured so that the user 102 may be enabled to select the credit/debit card to be used when executing a transaction. Primary smart card 100 may include touch screen 108. Touch screen 108 may display selectable options of one or more debit/credit cards associated with the user. Upon selection by the user, the transaction may be executed with the card payment data of the selected card.

Primary smart card 100 has a width w and length l. Primary smart card 100 may be any suitable size. For example, width w may be 53.98 millimeters ("mm"). Length l may be 85.60 mm. Smart card 100 has a thickness t. An illustrative thickness may be 0.8 mm. An exemplary form factor of smart card 100 may be 53.98 mm×85.60 mm×0.8 mm. This exemplary form factor may allow smart card 100 to fit into a user's wallet or pocket. This exemplary form factor may allow smart card 100 to fit into a card reader of an ATM and/or any suitable POS device.

Figure 2:
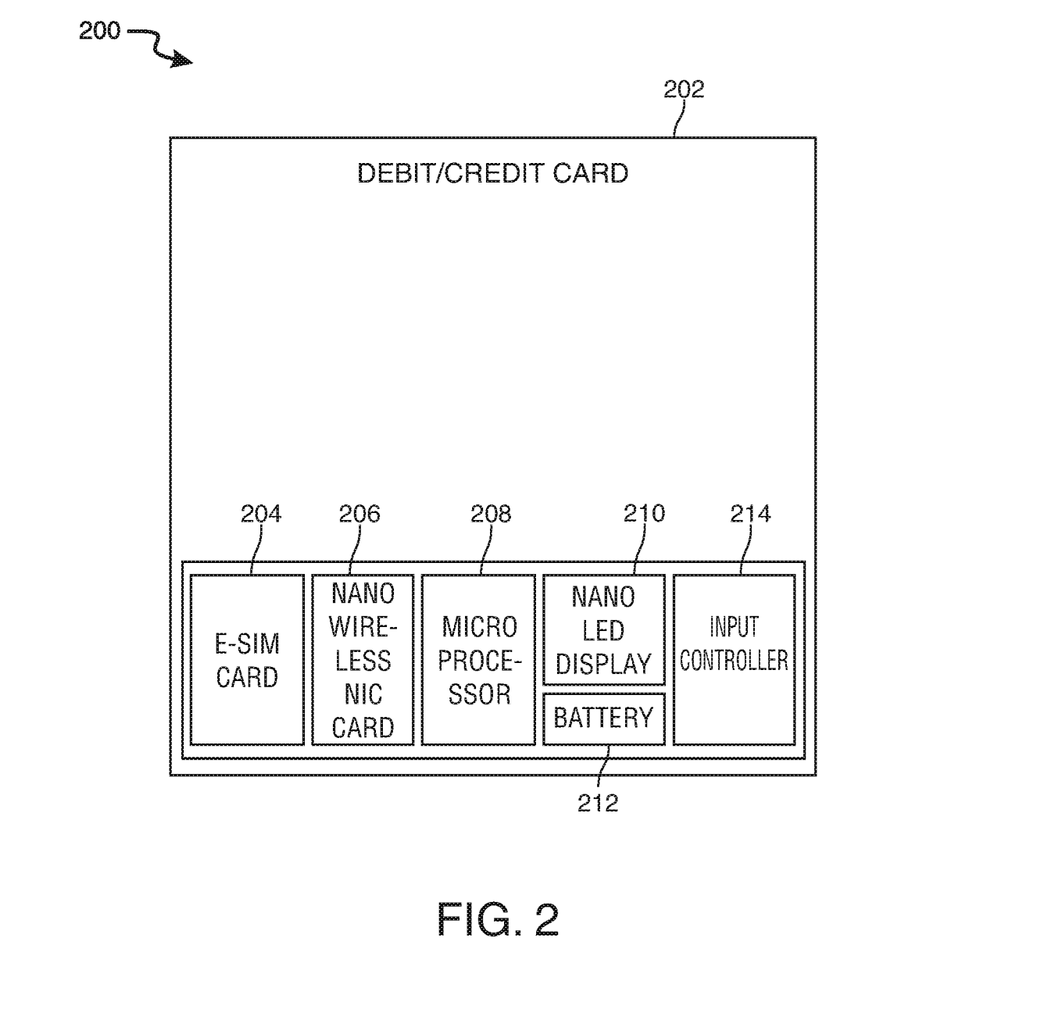
FIG. 2 shows an illustrative architecture in accordance with principles of the disclosure.

FIG. 2 shows an exemplary system architecture 200 in accordance with principles of the disclosure. Smart card 202 may include one or more features of smart card 100. Smart card 202 may be a primary smart card. Smart card 202 may be a dominant or subordinate smart card in accordance with principles of the disclosure.

Microprocessor 206 may control overall operation of smart card 202 and its associated components. For example, microprocessor 206 may activate or deactivate touch screen 108. When touch screen 108 is active, input controller 214 may capture and encrypt touch inputs. When touch-sensitive screen 108 is inactive, input controller 214 may not receive touch data from touch screen 108. For example, in the inactive state, power may not be supplied to touch screen 108.

Additionally, microprocessor 206 may control operation of NIC 204 and communication via a wireless controller and WiFi component. Wireless communication may be with one or more central systems, such as financial institutions, which may be associated with the user and/or senders or receivers in a transaction. In case of a transaction, the system may include a payment controller. The microprocessor 206 may draw power from battery 212.

Smart card 202 may include nano LED display 210. Microprocessor 206 may activate or deactivate nano LED display 210 for controlling a display on the card 202.

The wireless controller may receive transaction instructions stored locally on smart card 202 via a communication interface, such as a wireless controller via the wifi device. The wireless controller may establish a wired or contact based connection with smart card 202. The communication controller may establish a wireless connection with smart card 202. For example, the communication controller may include an NFC reader or a Wi-Fi antenna.

The wireless controller may include a card reader (not shown) for establishing a wired connection with smart card 202. The card reader may include circuitry for interacting with smart card 202. For example, the wireless controller may include one or more read heads. The read head(s) may include a plurality of sub-heads that are positioned to extract information encoded on the smart card 202. The sub-heads may be positioned based on target chip locations as defined in ISO 7816, which is hereby incorporated herein by reference in its entirety.

Smart card 202 also includes a communication interface. Communication interface may include a network interface or adapter. Communication interface may include hardware and/or software for establishing a communication channel with a user's mobile device and with a POS device. Communication interface may be configured to implement protocols for wireless and/or wired communication with the user's mobile device and/or POS device.

Smart card 202 may also include E-SIM 204. E-SIM 204 may be configured to store all of the card's payment data on the E-SIM 204. In embodiments of a primary/dominant smart card, E-SIM 204 may store card payment data associated with one or more of the user's credit/debit cards. The card payment data may be stored in real-time. The card payment data may be data from a previous transaction and may be changed at any time. In embodiments of a subordinate smart card, E-SIM 204 may store one card number. The associated card payment data of the card number may also be stored on the E-SIM 204. The associated card payment data, aside from the card number, may be changed via a digital wallet application of the user of the dominant smart card.

Figure 3:
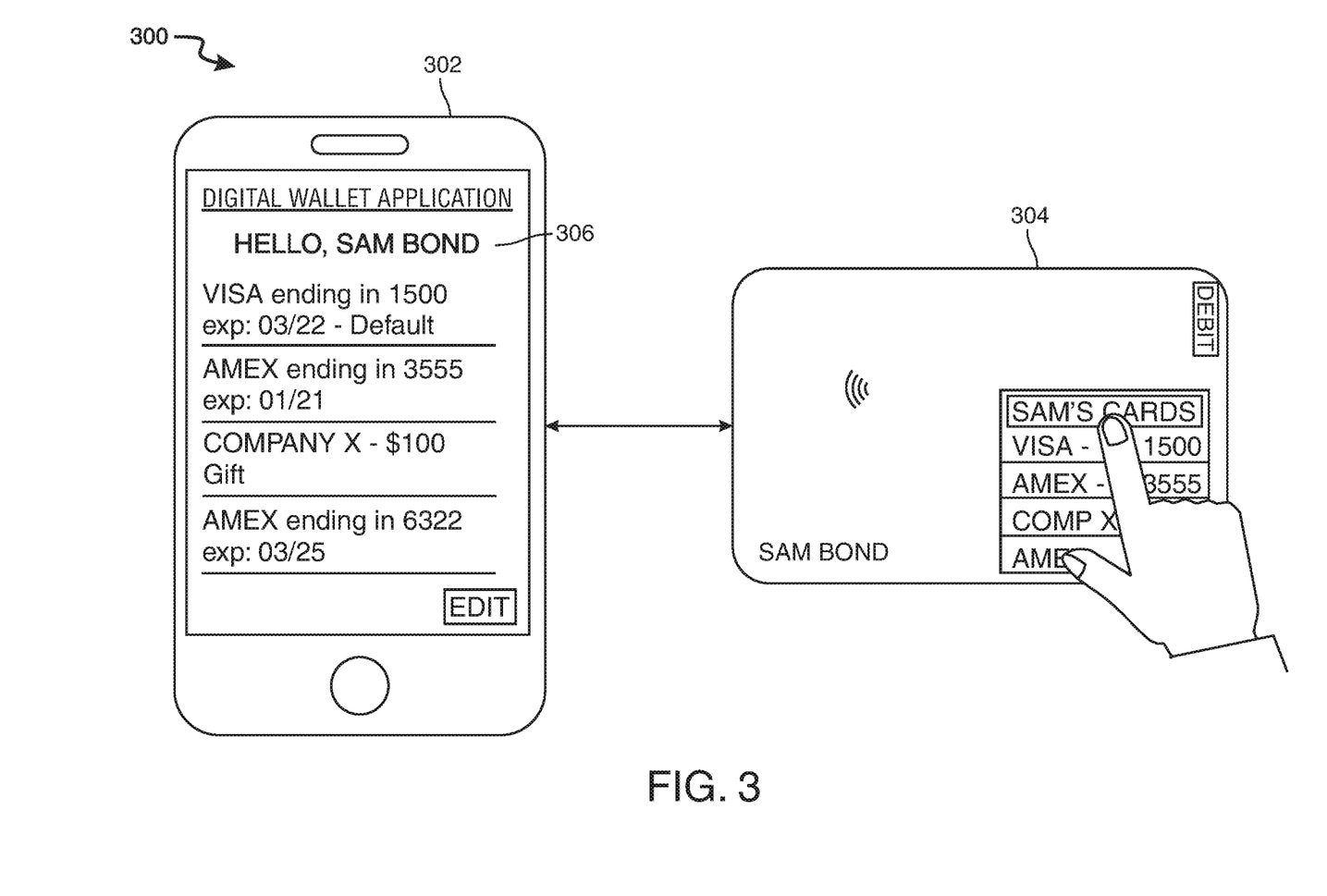
FIG. 3 shows an exemplary diagram in accordance with principles of the disclosure.

FIG. 3 shows an exemplary diagram 300. Diagram 300 may include primary smart card 304 and digital wallet application 302 associated with a user 306 in accordance with principles of the disclosure.

Digital wallet application 302 may be in electronic communication with primary smart card 304. Digital wallet application 302 may be an application resident on user 306 mobile device. User 306 may be the user and owner of primary smart card 304. Digital wallet application 302 may store credit/debit card payment data associated with each of the user's 306 credit/debit cards.

User 306 may be enabled to use digital wallet application 302 on the user's mobile device to make a payment and/or perform any transaction. Additionally, user 306 may be enabled to use primary smart card 304 to make a payment and/or perform any transaction. Primary smart card 304, when performing a transaction, may be configured to represent any one of the user's credit/debit cards stored within digital wallet application 302.

The user's credit/debit cards may be displayed on the screen of the user's mobile device within the digital wallet application as shown at 302. In this exemplary diagram 300, user 306 may have four credit/debit cards stored in his digital wallet application. The first credit card may be a VISA ending in '1500'. Associated data for the first credit may be displayed as well. User 306 may be enabled to set any one of the credit/debit cards to be the default card. The default card may be the default card when using the mobile device to perform a transaction. The default card may be the default card when using the primary smart card to perform a transaction.

The second credit card may be an AMEX ending in '3555.' Associated data for the second card may be displayed as well. The third card may be a gift card. In this exemplary diagram, the gift card may be for Company X. The total credit on the gift card may be displayed as well. The fourth credit card may be a second AMEX ending in '6322.' Associated data for the fourth card may be displayed as well.

User 306 may be enabled to edit data associated with the each smart card within the application.

Primary smart card 304 may be configured to be enabled to retrieve data associated with each of the smart cards stored on the digital wallet application 302. A shorter version of the data for each card may be displayed on the touch screen of primary smart card 304. User 306 may be enabled to select one of the cards for use when performing a transaction. The card payment data associated with each of the cards may be stored on the E-SIM embedded within primary smart card 304. In some embodiments, only the card payment data associated with the selected smart card may be stored on the E-SIM and may be overwritten when an alternate card is selected.

Figure 4:
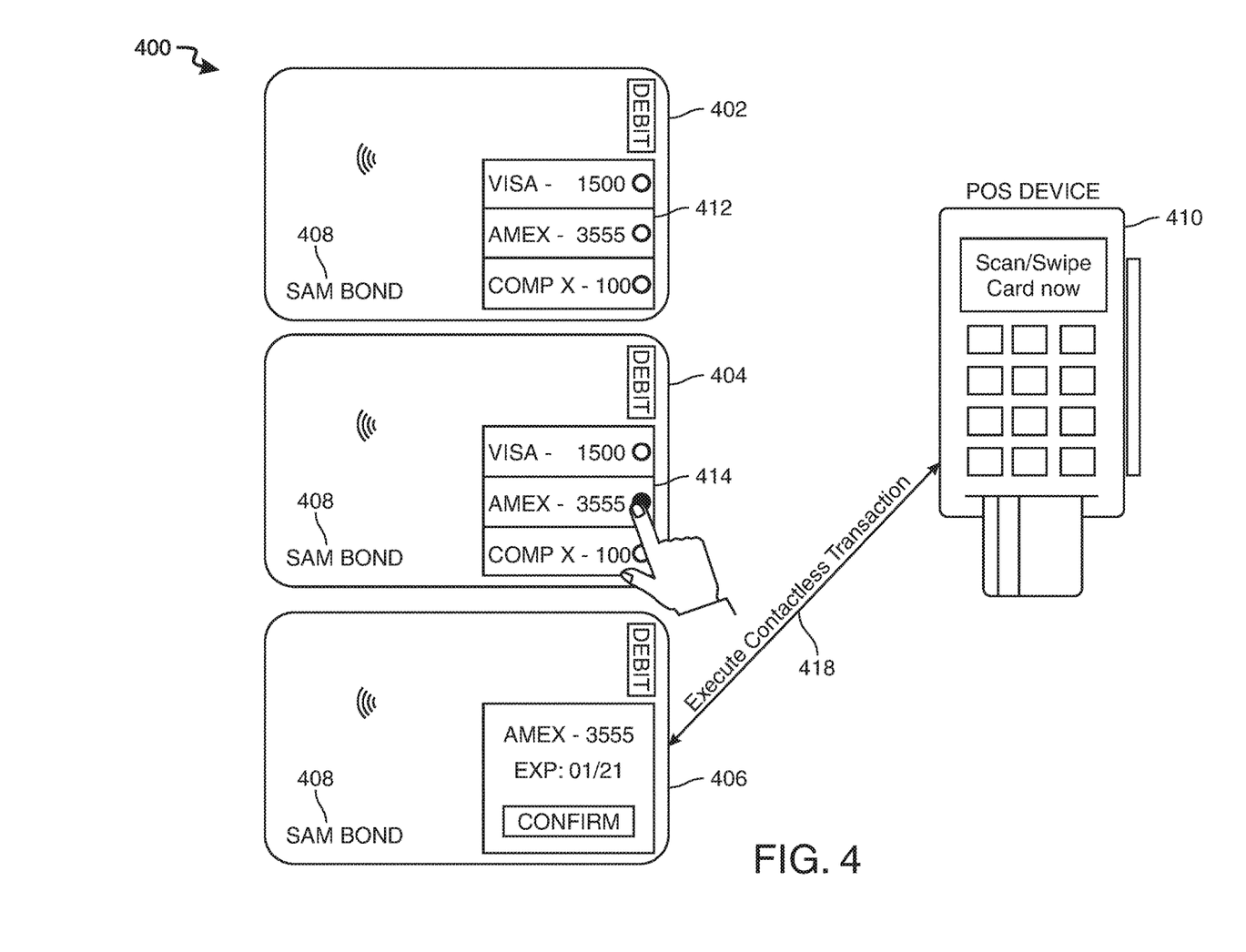
FIG. 4 shows an exemplary diagram in accordance with principles of the disclosure.

FIG. 4 shows an exemplary process 400 of a primary smart card in accordance with principles of the disclosure. Primary smart card 402 may be within close proximity to POS device 410. The close proximity may enable NFC to communicate between the POS device 410 and primary smart card.

It should be appreciated that the mobile device of user 308 may be in near distance of the primary smart card in order to communicate with the digital wallet application 302 (displayed in FIG. 3.)

At step 402, primary smart card 304 may retrieve a selection of smart cards associated with user 408 displayed on touch screen 412. The selection may be transmitted at the time the primary smart card 402 is approaching the POS device 410.

At step 404, the user may select a credit card to be used for the transaction, as shown at 414. At step 406, card payment data associated with the selected card may be displayed on the touch screen. The card payment data may be retrieved, in real-time, from the digital wallet application 302.

At step 418, the card payment data may be transmitted to the POS 410 to perform a transaction. The data may be transmitted from the E-SIM stored on the primary smart card.

Figure 5:
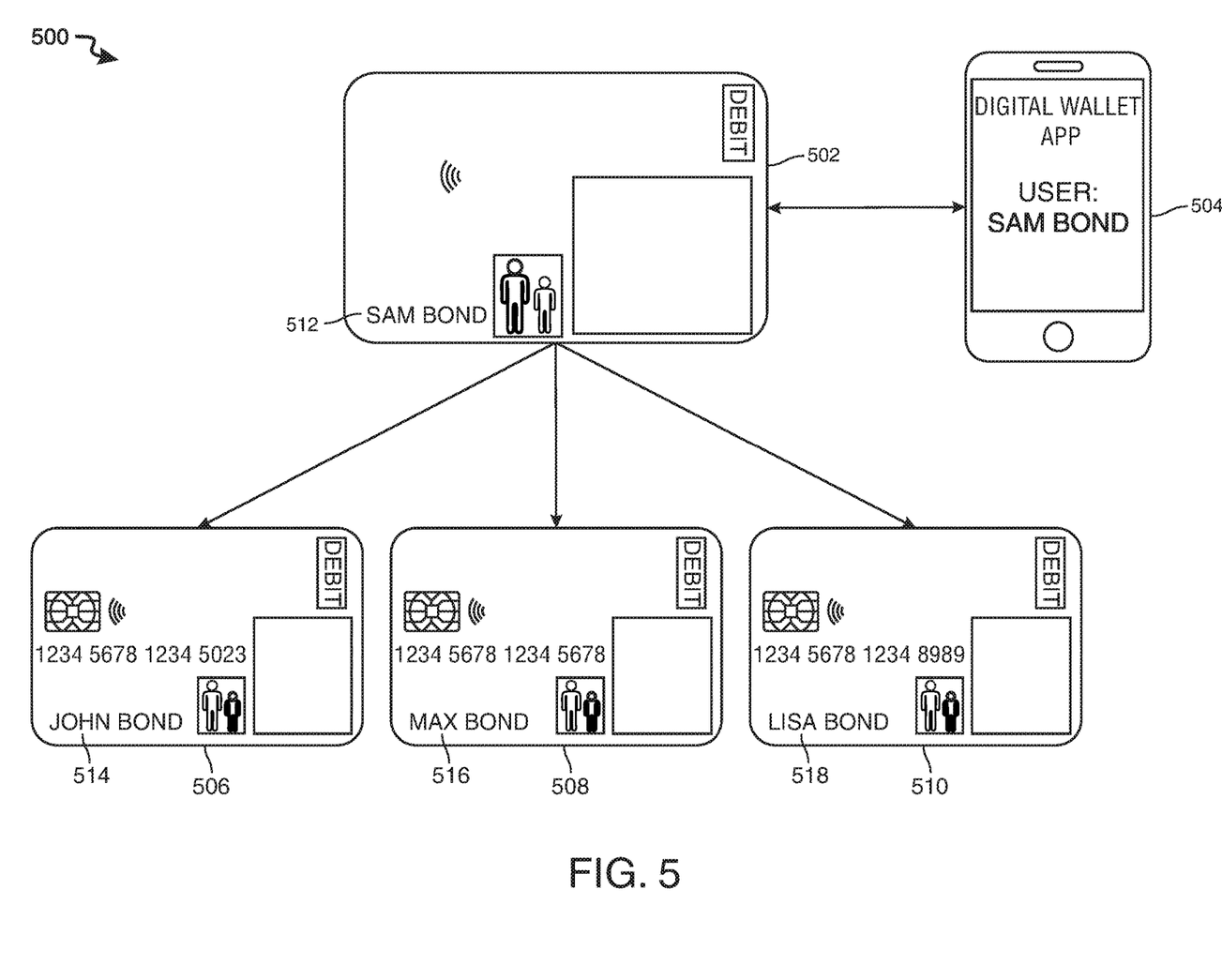
FIG. 5 shows an exemplary diagram in accordance with principles of the disclosure.

FIG. 5 shows a smart card communication system 500 in accordance with principles of the disclosure. Each of cards 502, 506, 508 and 510 may be smart cards. Each of the smart cards may be either a debit or credit card. Smart card 502 may be a dominant smart card.

In some embodiments, the dominant smart card 502 may be a primary smart card as described in the disclosure. In some embodiments, dominant smart card 502 may be a dominant smart card for each of the subordinate smart cards. Smart cards 506, 508 and 510, this exemplary communication system may be subordinate smart cards.

Dominant smart card 502 may be associated with user 512—'Sam Bond.' User 512 may be the sole user enabled to configure the data on smart card 502 and smart cards 506, 508 and 510. User 512 may be the user of the mobile device 504.

In this example, user 512 may be the head of a family. User's 514, 516 and 518 may be dependents of user 512. Dependents 514-518 may each possess their own credit card. User 512 may be enabled to manage and monitor each of smart cards 506-510 via the user's digital wallet application. Card payment data associated with each of smart cards 514-518 may be stored on the smarts cards E-SIM for each card. The card payment data may also be stored within the digital wallet application.

Figure 6:
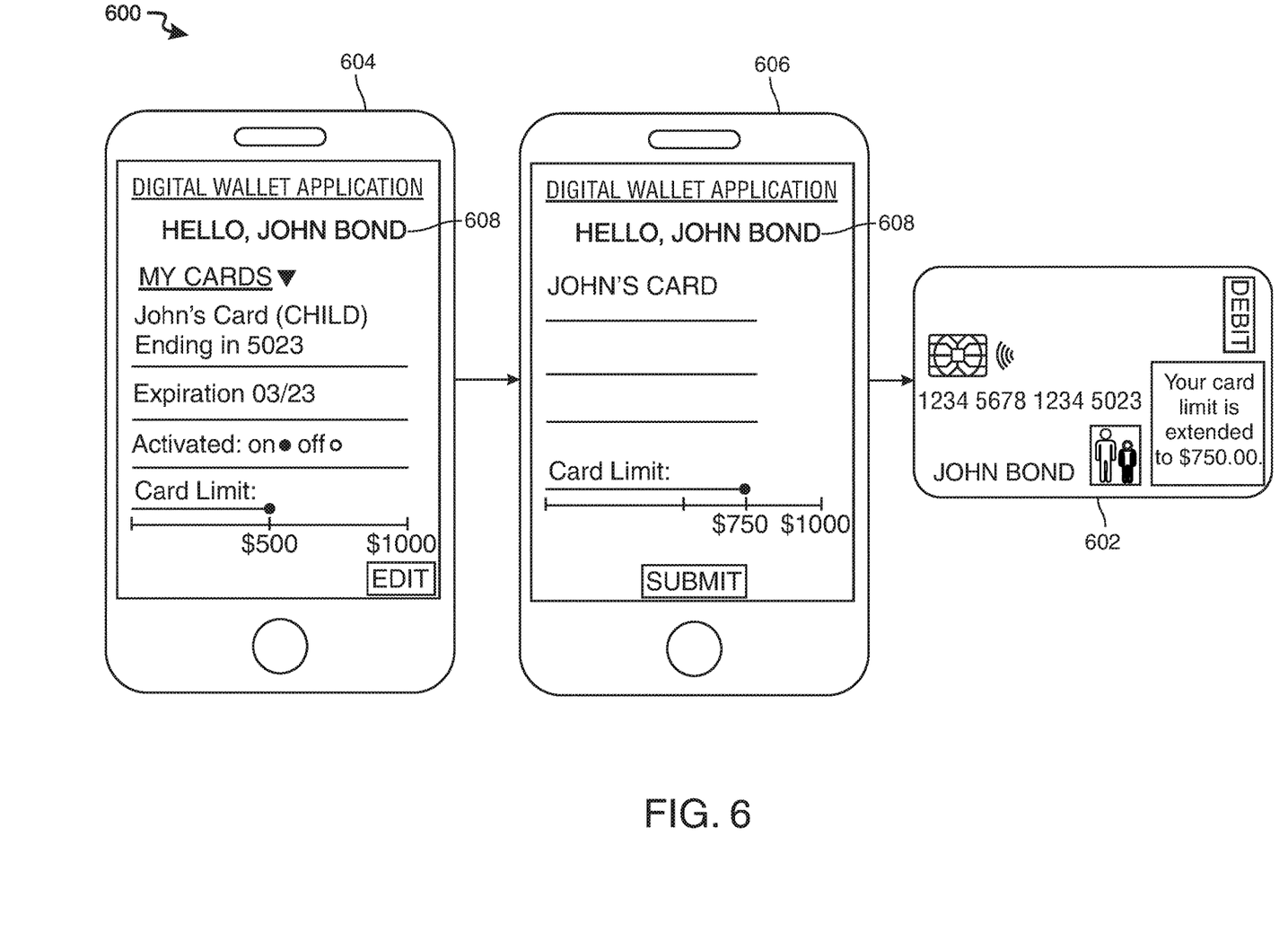
FIG. 6 shows an exemplary diagram in accordance with principles of the disclosure.

FIG. 6 shows an exemplary diagram 600 of a communication between the digital wallet application and a smart card.

The smart card 602, in this example, may be a subordinate smart card. The digital wallet application may be resident on the mobile device of the user of the dominant smart card.

User 608 may be able to view and manage the user's own smart cards within the digital wallet application 604. User 608 may be enabled to view and manage each of the subordinate smart cards 506-510 within the digital wallet application, as shown at 604.

In this exemplary diagram 600, user 608 may select one of the dependent's smart cards. 'John' may be the selected card. User 608 may wish to adjust the maximum credit limit on 'John's' card. The adjustment may only be performed via user 608. 'John's' card may have a maximum limit of $1000.00. However, user 608 may have previously selected $500.00 as the maximum limit for 'John.'

User 608 may adjust the maximum credit limit at any time. At 606, user 608 may adjust the maximum credit limit to $750.00. This change may automatically be reflected and saved on the E-SIM card stored on 'John's' smart card 602. The change may also be displayed on the touch screen of smart card 602. This may enable 'John' to be updated on the change and to be aware of the increased credit card limit. This change may not entail the need to contact the smart card provider and/or financial institution. The card payment data may be directly transmitted from the digital wallet application to the user's E-SIM card within the smart card itself. The updated change may overwrite the existing maximum credit card limit stored on the E-SIM.

Thus, methods and apparatus for enabling a smart card to operate as a primary smart card for a plurality of a user's smart cards is provided. Persons skilled in the art will appreciate that the present invention can be practiced by other than the described embodiments, which are presented for purposes of illustration rather than of limitation, and that the present invention is limited only by the claims that follow.

What is claimed is:

1. A primary smart card comprising wireless communication capabilities, the primary smart card serving as a representative for all of a user's payment cards, the primary smart card in wireless communication with a digital wallet application resident on the users mobile device, the primary smart card comprising:
   a microprocessor;
   a touch screen;
   a wireless communication interface configured to provide wireless communication;
   an embedded subscriber identification module ("E-SIM") card comprising re-writable card data associated with the primary smart card;
   a power source for providing, power to the microprocessor, the E-SIM and the touch screen, and wherein when the primary smart card is within a pre-determined proximity of a point-of-sale ("POS") device, the primary smart card is configured to:
prompt the user, on the touch screen, for a selection of a smart card from a selectable list of a plurality of smart cards displayed on the touch screen;
receive, via the touch screen, a selected smart card; and
upon receipt of the selected smart card:
retrieve card payment data from the mobile wallet application associated with the selected smart card; and
transmit the card payment data to the POS to complete the transaction.

2. The primary smart card of claim I wherein the card data stored on the E-SIM comprises:
a card number;
a date of expiration for the card number;
a maximum spending limit value associated with the card number; and
a telephone number associated with the card number.

3. The primary smart card. of claim 1 wherein the pre-determined proximity is a proximity that enables a near-field communication ("NFC") between the primary smart card and the POS in order to complete the transaction.

4. The primary smart card of claim 1 wherein when the POS device is not configured for NFC, the primary smart card is configured to:
retrieve the card payment data from the mobile wallet application associated with the selected smart card; and
display the card payment data on the touch screen.

5. The primary smart card of claim 4 wherein the card payment data is embedded in a QR code shown on the touch screen and configured to be scanned at the POS device.

6. The primary smart card of claim 1 wherein the digital wallet application is a remote SIM provisioning system.

7. The primary smart card of claim 1 wherein a card number for the primary smart card is the card number stored on the E-SIM.

8. The primary smart card of claim 7 wherein prior to the prompting of the user for a selected card, the primary smart card is configured to authenticate the user as an owner of the primary smart card by:
transmitting a communication to the mobile device that is linked to the primary smart card of the user, the communication comprising a request for input of a personal identification number ("PIN") associated with a primary smart card account of the user;
receiving input of the PIN;
verifying the PIN; and
following verification, displaying the plurality of smart cards on the touch screen of the primary smart card.

9. The primary smart card of claim 1 wherein the primary smart card comprises a thickness not greater than 0.8 millimeters ("mm") and a surface area not greater than 86 mm×54 mm.

10. A smart card communication system comprising:
a plurality of smart cards, the plurality of smart cards comprising a dominant smart card and a plurality of subordinate smart cards, each of the plurality of smart cards comprising:
a microprocessor;
a touch screen; and
an embedded subscriber identification module ("E-SIM") card configured for storing card data, the card data being dynamic card data, the card data comprising:
a card number;
a date of expiration for the card number;
a maximum spending limit value for the card number; and
an activation state value; and
a digital wallet application resident on a mobile device of a user of the dominant smart card, the digital wallet application for managing the card data stored on each E-SIM for each of the plurality of smart cards, the digital wallet application configured to be managed solely by the user of the dominant smart card, the digital wallet application in electronic communication with each of the plurality of smart cards.

11. The smart card communication system of claim 10 wherein the card number associated with each of the plurality of subordinate smart cards is a static card number.

12. The smart card communication system of claim 10 wherein the card number associated with each of the plurality of subordinate smart cards comprises a non-configurable card number stored on a magnetic strip amid/or or chip on the card.

13. The smart card communication system of claim 10 wherein the card data stored on the E-SIM for each of the plurality of subordinate smart cards, aside from the card number, is configurable by the user of the dominant smart card, via the digital wallet application.

14. The smart card communication system of claim 10 wherein the card number associated with the dominant smart card is stored on the E-SIM and is configurable to be changed to an alternate card number.

15. The smart card communication system of claim 14 wherein when the card number is changed to an alternate card number, the date of expiration and the maximum spending limit value are automatically updated on the E-SIM to correlate to the alternate card number.

16. The smart card communication system of claim 10 wherein the data on each E-SIM is re-writable by the digital wallet application.

17. The smart card communication system of claim 10 wherein when the user administers a change to the data for one of the subordinate smarts cards, via the digital wallet application, the change to the data is automatically altered, in real-time, within the E-SIM of the associated subordinate smart card.

18. The smart card communication system of claim 10 wherein the dominant smart card is enabled to change an activation state on one or more of the plurality of subordinate smart cards, the activation state change comprising:
changing a setting on the digital wallet application associated with activation data of the one or more of the subordinate smart cards;
transmitting the activation data change to the one or more subordinate smart cards; and
overwriting the activation state value on the E-SIM to reflect the setting change.

19. The smart card communication system of claim 10 wherein the digital wallet application is a remote subscriber identification module provisioning system.

20. A method for enabling, via a digital wallet application, a smart card to operate as a primary smart card for a plurality of a user's smart cards, the primary smart card comprising a microprocessor, a touch screen, a wireless interface configured to provide wireless communication, an embedded subscriber identification module ("E-SIM") card comprising re-writable card data associated with the primary smart card, a power source for providing power to the microprocessor and the E-SIM, the touch screen, the method comprising:

storing card data associated with each of the plurality of smart cards in a database associated with the digital wallet application;

retrieving on the primary smart card from the digital wallet application, a list of the plurality of smart cards;

displaying on the touch screen of the primary smart card, a selectable list of the plurality of smart cards;

receiving, via the touch screen, a selected smart card; and storing the card data associated with the selected smart card on the E-SIM of the primary smart card, the card data being stored replacing previously stored card data stored on the E-SIM; and wherein when the primary smart card is within a predetermined proximity to a point-of-sale ("POS") device, the primary smart card is configured to transmit the card payment data stored on the E-SIM to the PUS device to complete a transaction.

* * * * *